US012567255B2

(12) United States Patent
Li et al.

(10) Patent No.: US 12,567,255 B2
(45) Date of Patent: Mar. 3, 2026

(54) FEW-SHOT VIDEO CLASSIFICATION

(71) Applicant: NEC Laboratories America, Inc.,
Princeton, NJ (US)

(72) Inventors: Kai Li, Plainsboro, NJ (US); **Renqiang
Min, Princeton, NJ (US); Haifeng Xia**,
New Orleans, LA (US)

(73) Assignee: NEC Corporation, Tokyo (JP)

( * ) Notice: Subject to any disclaimer, the term of this
patent is extended or adjusted under 35
U.S.C. 154(b) by 349 days.

(21) Appl. No.: 18/366,931

(22) Filed: Aug. 8, 2023

(65) Prior Publication Data

US 2024/0054782 A1 Feb. 15, 2024

Related U.S. Application Data

(60) Provisional application No. 63/424,159, filed on Nov.
10, 2022, provisional application No. 63/397,460,
filed on Aug. 12, 2022.

(51) Int. Cl.
*G06V 20/40* (2022.01)
*G06V 10/774* (2022.01)

(52) U.S. Cl.
CPC ............ *G06V 20/41* (2022.01); *G06V 10/774*
(2022.01); *G06V 20/46* (2022.01); *G06V
20/48* (2022.01)

(58) Field of Classification Search
CPC ...... G06V 20/41; G06V 10/774; G06V 20/46;
G06V 20/48; G06V 10/761; G06V
10/764; G06V 10/82
See application file for complete search history.

(56) References Cited

U.S. PATENT DOCUMENTS

| | | | | | |
|---|---|---|---|---|---|
| 9,922,411 | B2 * | 3/2018 | Aydin | .................... | H04N 19/00 |
| 10,885,341 | B2 * | 1/2021 | Chen | ...................... | G06N 20/00 |
| 12,217,137 | B1 * | 2/2025 | Fakoor | .................... | G06N 20/00 |
| 2016/0335224 | A1 * | 11/2016 | Wohlberg | ............... | H03M 7/00 |
| 2017/0308754 | A1 * | 10/2017 | Torabi | .................... | G06V 20/20 |
| 2019/0258953 | A1 * | 8/2019 | Lang | ........................ | G06N 3/08 |
| 2021/0124987 | A1 * | 4/2021 | Gan | ..................... | G06V 10/764 |
| 2023/0117307 | A1 * | 4/2023 | Kim | ...................... | G06V 10/87 |
| | | | | | 382/159 |

OTHER PUBLICATIONS

Cao et al., "Few-Shot Video Classification via Temporal Align-
ment", InProceedings of the IEEE/CVF Conference on Computer
Vision and Pattern Recognition 2020, Jun. 2020, pp. 10618-10627.

* cited by examiner

*Primary Examiner* — Andrew M Moyer
*Assistant Examiner* — Ahmed A Nasher
(74) *Attorney, Agent, or Firm* — Vincent Duffy; Joseph
Kolodka

(57) ABSTRACT

Methods and systems for video processing include enriching
an input video feature from an input video frame set using
a meta-action bank video sub-actions to generate enriched
features. Reinforced image representation is performed
using reinforcement learning to compare support image
frames and query image frames and determine an impor-
tance of the input video frame. A classification is performed
on the input video frame based on the importance and the
enriched features to generate a label. An action is performed
responsive to the generated label.

12 Claims, 5 Drawing Sheets

FEW-SHOT VIDEO CLASSIFICATION

RELATED APPLICATION INFORMATION

This application claims priority to U.S. Patent Application No. 63/397,460, filed on Aug. 12, 2022, and to U.S. Patent Application No. 63/424,159, filed on Nov. 10, 2022, incorporated herein by reference in their entirety.

BACKGROUND

Technical Field

The present invention relates to video classification and, more particularly, to training machine learning models for video classification.

Description of the Related Art

While machine learning-based video classification is a powerful tool for identifying actions within a video stream, the need for labeled training data makes the creation of such models challenging.

SUMMARY

A method for video processing includes video processing include enriching an input video feature from an input video frame set using a meta-action bank video sub-actions to generate enriched features. Reinforced image representation is performed using reinforcement learning to compare support image frames and query image frames and determine an importance of the input video frame. A classification is performed on the input video frame based on the importance and the enriched features to generate a label. An action is performed responsive to the generated label.

A system for video processing includes a hardware processor and a memory that stores a computer program. When executed by the hardware processor, the computer program causes the hardware processor to enrich an input video feature from an input video frame set using a meta-action bank of video sub-actions to generate enriched features, perform reinforced image representation using reinforcement learning to compare support image frames and query image frames and determine an importance of the input video frame, perform a classification on the input video frame based on the importance and the enriched features to generate a label, and perform an action responsive to the generated label.

A method for training a neural network model includes learning a meta-action bank that includes video sub-actions to generate enriched features. A reinforcement learning policy network is trained while parameters of a classifier are held constant, the reinforcement learning policy network being used to determine an importance of input video frames. The classifier is trained while parameters of the reinforcement learning policy network are held constant, the classifier being used to generate a label for input video frames based on the importance.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Few-shot training of a neural network model makes use of a relatively small number of training samples to generate a robust model that generalizes to categories that were not present in the training dataset. In the context of video classification tasks, such as action recognition, generating training samples can be a time-consuming manual process, as a person's intervention may be needed to identify the exact starting and stopping frames of the action within the video stream.

Meta-action learning may be used to introduce external global knowledge into specific samples to enrich video representations. Meta-action learning may learn a meta-action bank across different samples from a meta-training set to refine samples and to adapt the property of a specific sample via single-value decomposition. This fuses the adaptive meta-action knowledge and episode-wise features to generate better action semantics. The term "episode" may be regarded as equivalent to a mini-batch in practice. Few-shot learning models are trained and tested on a per-task basis. Each mini-batch is a task and is referred to herein as an episode.

Furthermore, a reinforced image representation helps to discover the importance of different frames in the video stream via a comparison between support and query video pairs, enhancing the positive influence of discriminative frames to help the model accurately capture sample-wise similarity. Few-shot learning is trained on a per-task basis. In each task, there is a support video set that includes videos from a set of sampled classes. The task also includes a query set which includes videos from the same sampled classes as the support set. The few-shot learning aims to minimize the classification risk of the query videos according to the supported videos, as they are labeled and from the same classes as the query videos.

Figure 1:
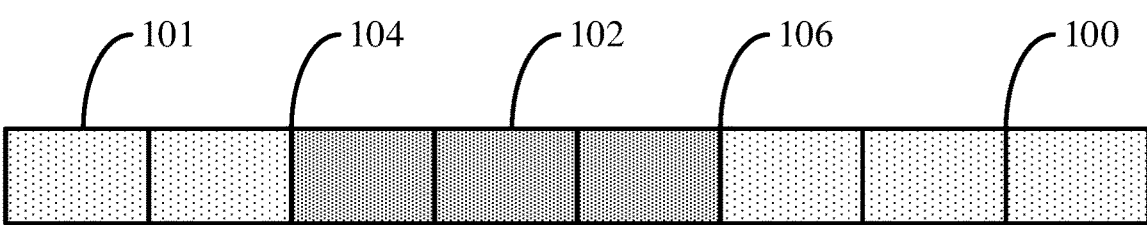
FIG. 1 is a diagram of temporal action localization within a video stream, in accordance with an embodiment of the present invention.

Referring now to FIG. 1, an exemplary video stream 100 is illustrated, being made up of a series of sequential video frames 101. Each video frame 101 may include an image that captures a camera's view at a particular time. Included in the video stream 100 is a series of action frames 102 that show a particular action taking place. The action frames 102 have a beginning time 104 and an ending time 106.

In a fully annotated video stream, the video stream 100 may include labels that explicitly indicate the beginning time 104 and the ending time 106, and may further include a label that identifies the action taking place in the action frames 102. In one example of a video stream 100, the video stream 100 may capture a sporting event, such as a long jump. The action frames 102 may show the actual jump taking place, while frames 101 before and after the action frames 101 may show related or unrelated activity, such as the jumper's run leading up to the jump and the jumper landing and walking away.

In few-shot video classification, a model is trained using a relatively small number of annotated video streams 100. To make model training and test environment consistent, a label-sufficient meta-training set $\mathcal{D}_{train}$ and another meta-testing set $\mathcal{D}_{test}$ may be used, with no category overlap between the sets. During training, videos of episodes may be collected from $\mathcal{D}_{train}$ and may be divided into support or query sets.

In a few-shot training task, the support samples may represent the relatively small set of well-labeled samples, while a query sample may be an unlabeled sample. The support set may include k well=labeled samples in each of n classes, which may be interpreted as an n-way-k-shot scenario. Under this condition, the relationship across support and query samples can be used to identify which category each query video belongs to. In the test stage, each episode also includes a support and query set derived from $\mathcal{D}_{test}$, but may have no overlap with the classes of the support samples and query samples.

In the above example, a video stream 100 can be decomposed into multiple image frames 101, which may be expressed as $X_i = \{x_{ij}\}_{j=1}^m$, where m is the number of frames in the $i^{th}$ video. The individual frames 101 correspond to sub-actions in the video. For example, a video of a sporting event, such as a long jump, records sub-actions like running, jumping, and landing. Videos from different categories may share sub-actions. For example, both long jump videos and videos of people playing basketball may include frames associated with similar jumping sub-actions, even though the running and landing sub-actions may be dissimilar. When these classes appear in different episodes, the transfer of similar patterns across them facilitates the model's ability to discover the similarity between support and query samples. As a result, the similar sub-actions can be represented by similar features.

Figure 2:
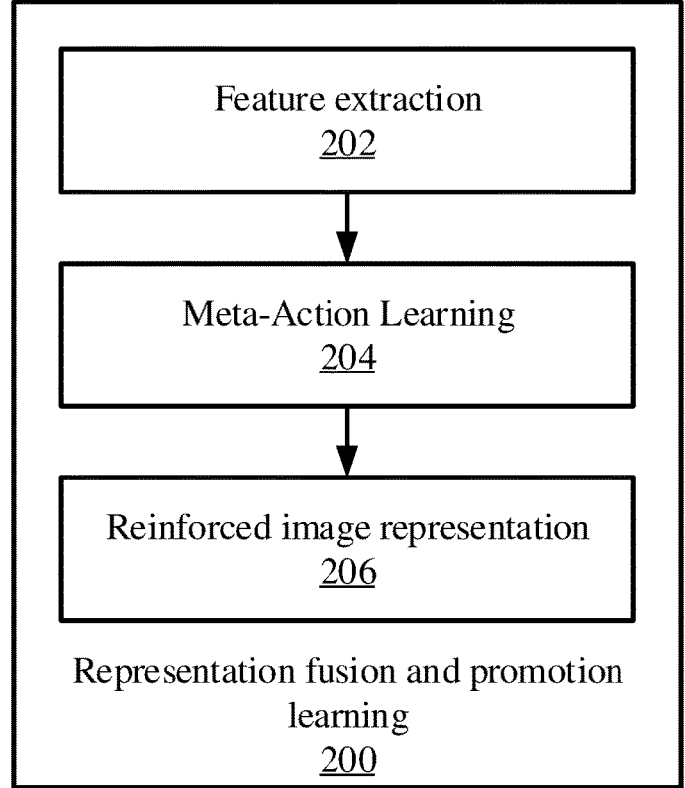
FIG. 2 is a block/flow diagram of a method for representation fusion and promotion learning, in accordance with an embodiment of the present invention.

Referring now to FIG. 2, a representation fusion and promotion learning framework 200 is shown. Video streams, including the query set and the support set, are processed by block 202 to extract high-level features of each frame, resulting in each video stream being transformed into a corresponding feature set $F_i = \{f_{ij} | f_{ij} = \Phi(x_{ij})\}_{j=1}^m$, where $\Phi$ is a pre-trained feature generator. Support videos within each episode may be converted into a feature matrix $F^s \in \mathbb{R}^{(d \times nkm)}$, where each column denotes the feature of one frame with the dimension as d, n is the number of classes in the support set, and k is the number of samples in each class. The term $F_i$ is a feature representation of the whole support set, which includes kn videos, with k videos for each of the n classes.

Meta-action learning 204 constructs a task-shared action bank D to store representations of sub-actions. A given action may be made up of a series of sub-actions, and may be expressed as a composite of sub-actions from the action bank D. Following the example described above, similar sub-actions in long jump videos and in basketball videos may be represented by the same atoms of the bank D. The bank D can be built and refined gradually, across different training episodes, with the help of $F^s$:

$$\min_{D,A} \|F^s - DA\|_F^2 + \|A\|_{\ell_1}$$

where $D \in \mathbb{R}^{d \times \kappa}$ is a learnable dictionary of actions and A is a sparse coefficient with $\ell_1$ norm, which controls the sparseness of the coefficient to achieve better reconstruction by using as few atoms as possible to avoid information redundancy in D. The term $\kappa$ refers to the number of atoms. D may be implemented as a randomly initialized tensor where each column represents an atom representation, and an online gradient update may be used to optimize D and A, for example with a learning rate between $10^{-3}$ and $10^{-5}$. An atom refers to a small basis that makes up a large object. For example, an action is composed of a series of atomic sub-actions. Thus, an action of performing a "slam dunk" may include atoms of running, the rise of the jump, the dunk, and falling.

After generating he task-shared meta-action bank, block 204 adaptively fuses the semantics into each specific episode. The bank D may be viewed as an action space, where each atom represents a basis vector. Not all are needed for a current episode, as the number of actions in D may be larger than the number of actions in a given episode. Episode-relevant basis vectors from D may therefore be highlighted, for example using a single-value decomposition (SVD) to decompose support feature matrix $F^s$ and memory bank D:

$$SVD(F^s) \rightarrow (U^s \Sigma^s V^s)^T, \quad SVD(D) \rightarrow (U\Sigma V)^T$$

where single values $\Sigma$ and $\Sigma^s$ control the contribution of corresponding basis vectors. SVD decomposes the feature matrix into three component matrices.

The information space basis in U/V is likely to be more robust and complete than that of $U^s/V^s$, as action bank refers sufficient videos. The action bank stores gist information from all action categories. Each task includes only part of the information for the model, but the action bank stores information from across the different tasks. Compared with $\Sigma$ and $\Sigma^s$, the real importance of basis vectors can be better estimated due to the fact that it is directly captured from a current episode. An episode-adaptive action bank can therefore be determined as $D^e = (U\Sigma^s V)^T$.

Block 204 further fuses the robust action semantics $D^e$ into video representations. The inner product between frame features for support video s and query video q may be denoted as $f_{*j}^{s/q}$ and $d_l^e \in D^e$ reflects the projection coefficient on each space basis. The adaptive update strategy generates an enriched feature and may be formalized as:

$$\tilde{f}_{*j}^{s/q} = (1 - \rho) f_{*j}^{s/q} + \rho \sum_{l=1}^{\kappa} \alpha_{jl} d_l^e$$

where $\alpha_{jl} = \cos(f_{*j}^{s/q}, d_l^e)$ denotes the cosine similarity and $\rho$ balances accepting external knowledge with keeping original representations. Since the support and query samples both undergo re-expression via $D^e$, their similar or dissimilar associations may be further adjusted and promoted.

Meta-action learning 204 thereby refines the feature representations using the action bank dictionary for all the frames of an input video stream 100. A video stream 100 may include several frames for which the background, illumination, and degree of association with category semantics may vary significantly. Thus, not all frames make the same contribution to discovering similarity across support and query samples.

To accurately capture the intrinsic associations, the representations of informative and discriminative frames may be enhanced. Thus, reinforced image representation 206 uses reinforcement learning to conduct dynamic comparisons between support and query image frames to identify the importance of each frame. Block 206 thereby generates a weight score $w_j^{s/q}$ per frame $f_i^{s/q}$ over time. The s/q indicates that the same practice is applied for both support samples s and query samples q.

At a time t, the importance $w_j^{s/q}$ of a corresponding frame is modified with the estimated action $a_t^{s/q} \in \{0, 1\}$, where t=j in practical implementations. The video representations at t after re-weighting the action may be expressed as the state $s_t^{s/q} = \{w_j^{s/q}\tilde{f}_{*j}^{s/q}\}|_{j=1}^m\}$. The reward may be determined as an improvement in the similarity between two adjacent states.

The discovery of important frames can be formulated as a Markov decision process. Given the estimated action value, the state is transferred from $s_t^{s/q}$ to $s_{t+1}^{s/q}$ according to an implicit probability distribution. During the state transition, the optimal action is determined at the current state. Q-learning may be used to accomplish this, with the expectation value of actions $a_t^{s/q}$ being notated as $Q_t$, where the current actions modify the importance of $w_j^{s/q}$ of frame $f_{*j}^{s/q}$. $Q_t$ can therefore be formulated as:

$$Q_t\left(s_t^{s/q}, a_t^{s/q}\right) = \max_\pi \mathbb{E}\left[r_t + \gamma r_{t+1} + \gamma^2 r_{t+2} \dots | \pi\right]$$

where $r_t$ is the reward of time t, $\gamma$ is a discount factor balancing immediate reward and future rewards, and $$\pi = \arg\min_{a_t^{s/q}} Q_t$$

is the policy. The term $\mathbb{E}$ refers herein to an averaging operator.

Using reinforcement learning, a deep Q network may be developed to estimate $Q_t$, which may accept the three parts as an input to predict the probability distribution of actions. The deep Q network may be implemented as, for example, three fully connected layers mapping the input to the number of action. One such part is the feature of the frame $\tilde{f}_{*j}^{s/q}$, on which the estimated action will operate. A second such part is the aggregated feature of the remaining frames:

$$\frac{1}{m-1}\sum_{l=1, l\neq j}^{m} w_l^{s/q}\tilde{f}_{*j}^{s/q}$$

The third part is another video $v_j$. Taking out the current frame elevates its contribution on the final prediction. Moreover, the special point lies in measuring the cosine similarities across this frame and other frames in another video, denoted as $v_j \in \mathbb{R}^m$ with its elements being $v_{ji}=\cos(\tilde{f}_{*j}^{s/q}, \tilde{f}_{*j}^{q/s})$. The term $v_j$ reflects its potential to promote the similarity of the two videos.

The concatenation of the three parts is used as input to a deep Q network. When the output of the network is $a_t^{s/q}=0$, the importance of the frame may be reduced by $w_j^{s/q}=w_j^{s/q}-p(a_j^{s/q})$, where $p(a_j^{s/q})$ is the probability for the action. For other cases, the weight update of the frame will be $w_j^{s/q}=w_j^{s/q}+p(a_j^{s/q})$.

After conducting an action, $w_j^{s/q} \in (0, 2)$, and the corresponding reward may be calculated by the change of similarity of video representations $r=\text{sign}(d(\tilde{f}^s, \tilde{f}^q)|s_{t+1}-d(\tilde{f}^s, \tilde{f}^q)|s_{t+1})$, where $d(\tilde{f}^s, \tilde{f}^q)$ stands for $\cos(\Sigma_{j=1}^m w_j^s \tilde{f}_{*j}^s, \Sigma_{j=1}^m w_j^q \tilde{f}_{*j}^q)$ and sign(•) is a sign function.

The deep Q network may then be optimized with the objective function:

$$\min_{\Theta} \mathbb{E}\left[r + \gamma \max_{\substack{s/q \\ a_{i+1}^{s/q}}} Q\left(s_{i+1}^{s/q}, a_{i+1}^{s/q}\right) - Q\left(s_i^{s/q}, a_i^{s/q}\right)\right]^2$$

where $\Theta$ denotes all the trainable network parameters of the deep Q network. For training a snapshot of the state, action, and reward at any time may be stored and divided into mini-batches with random sampling. An $\epsilon$-greedy strategy may be used to determine the action using $\pi$ with probability $\epsilon$ and using random actions with $1-\epsilon$ probability. For inference, the parameters of the trained deep Q network may be frozen and the weight for each frame may be inferred given support and query video pairs.

Thus the meta-action learning 204 stores action semantics via $\mathcal{D}_{train}$ and is adapted into each episode to enhance video representations, while reinforced image representation 206 exploits deep Q learning to increase the representation of informative frames. The output of the representation fusion and promotion learning 200 can be used with a few-shot video classifier to boost the trained model's performance.

Figure 3:
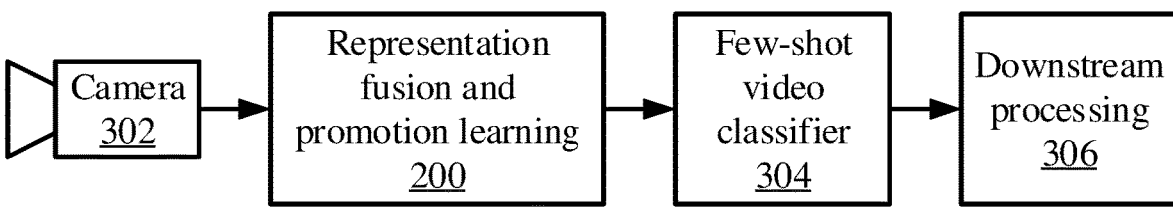
FIG. 3 is a block diagram of a video processing system that uses representation fusion and promotion learning, in accordance with an embodiment of the present invention.

Referring now to FIG. 3, the representation fusion and promotion learning 200 is shown in the broader context of a few-shot video classification task. A camera 302 generates a video stream 100, for example made up of frames 101 including one or more actions of interest. The video stream 100 is first processed by representation fusion and promotion learning 200 before being input to the few-shot video classifier 304. The classifier 304 identifies actions within the video stream 100 and downstream processing 306 performs an action responsive to the action classification.

For example, action classification may be used in the context of a sporting event, where the responsive action may include automatically generating additional information relating to the detected action such as an identification of the actor, statistics relating to the actor or the detected action, and updates to the state of the sporting event based on the outcome of the action. For example, a duration of the action may be determined based on the starting time and ending time, and the duration may be used to report on or control the state of the event. Other uses for temporal action localization include security monitoring, for example identifying hazardous events in a video feed, and video labeling to segment videos based on semantic meaning to aid in summarizing important information from the video.

Any appropriate type of few-shot video classifier 304 may be used. Exemplary classifier models include ordered temporal alignment models, temporal-relational crosstransformers, and spatio-temporal relation modeling. In the context of ordered temporal alignment, the meta-action learning 204 may be combined with the outputs of the feature extraction 202, while reinforced image representation 204 may be performed before the calculation of frame-wise similarity between video pairs.

In the context of temporal-relational crosstransformers, average pooling features from the feature extraction 202 may be used as inputs for the meta-action learning 204 and refined representations may further participate in the selection of discriminative frames. In this case, the reinforced image representation 204 may compare the given query instances with all support videos to determine an optimal weighted query representation with the highest similarity.

In the context of spatio-temporal relation modeling, the feature maps may be used before the average pooling of feature extraction 202 as input to a transformer block, before compressing them into a frame-level vector representation as $F_i^{s/q}$.

Figure 4:
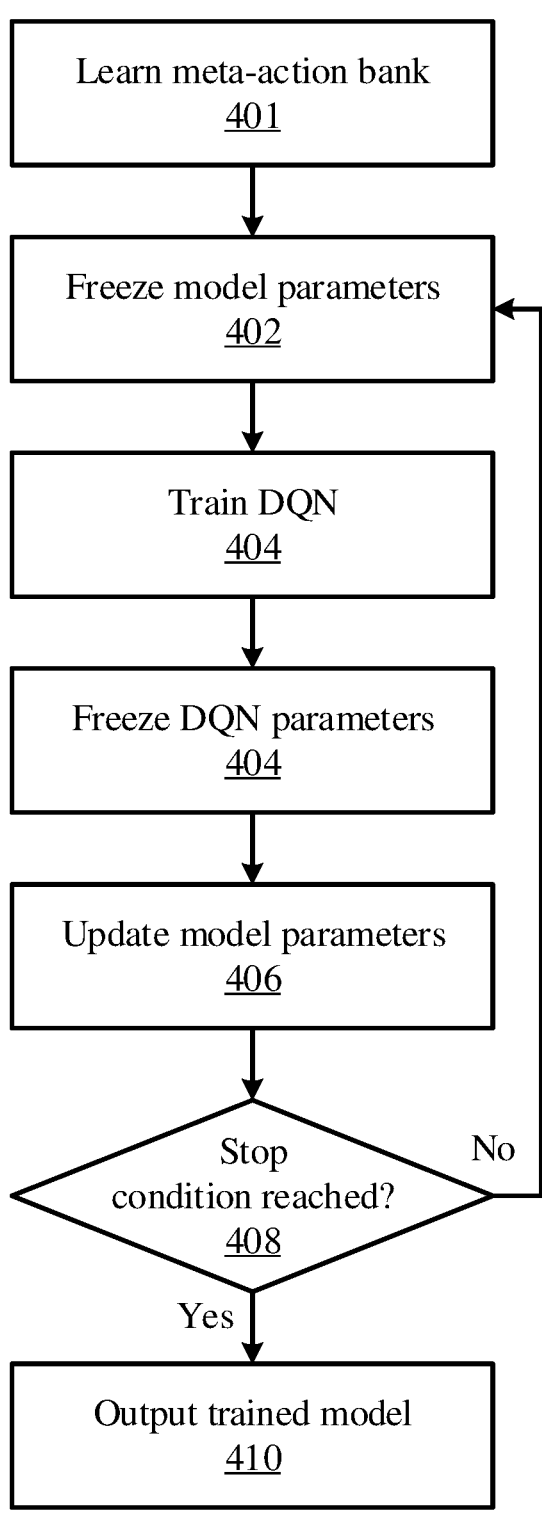
FIG. 4 is a block/flow diagram of a method for training a neural network model, in accordance with an embodiment of the present invention.

Referring now to FIG. 4, a method for training a model is shown. Block 401 learns the meta-action bank. As described above, the model may include feature extraction 202, a deep Q network, and a few-shot video classifier 304. Training may be an iterative process, where model parameters including the feature extraction 202 and the classifier 304 may be frozen by block 402 while block 404 trains the deep Q network.

In each iteration, several episodes may be used to train the deep Q network. Then the parameters of the deep Q network may be frozen in block 406 and the other parts of the model may be updated in block 408 using another set of episodes. This process may repeat until block 410 reaches an appropriate stopping condition, at which point block 412 outputs the trained model.

Figure 5:
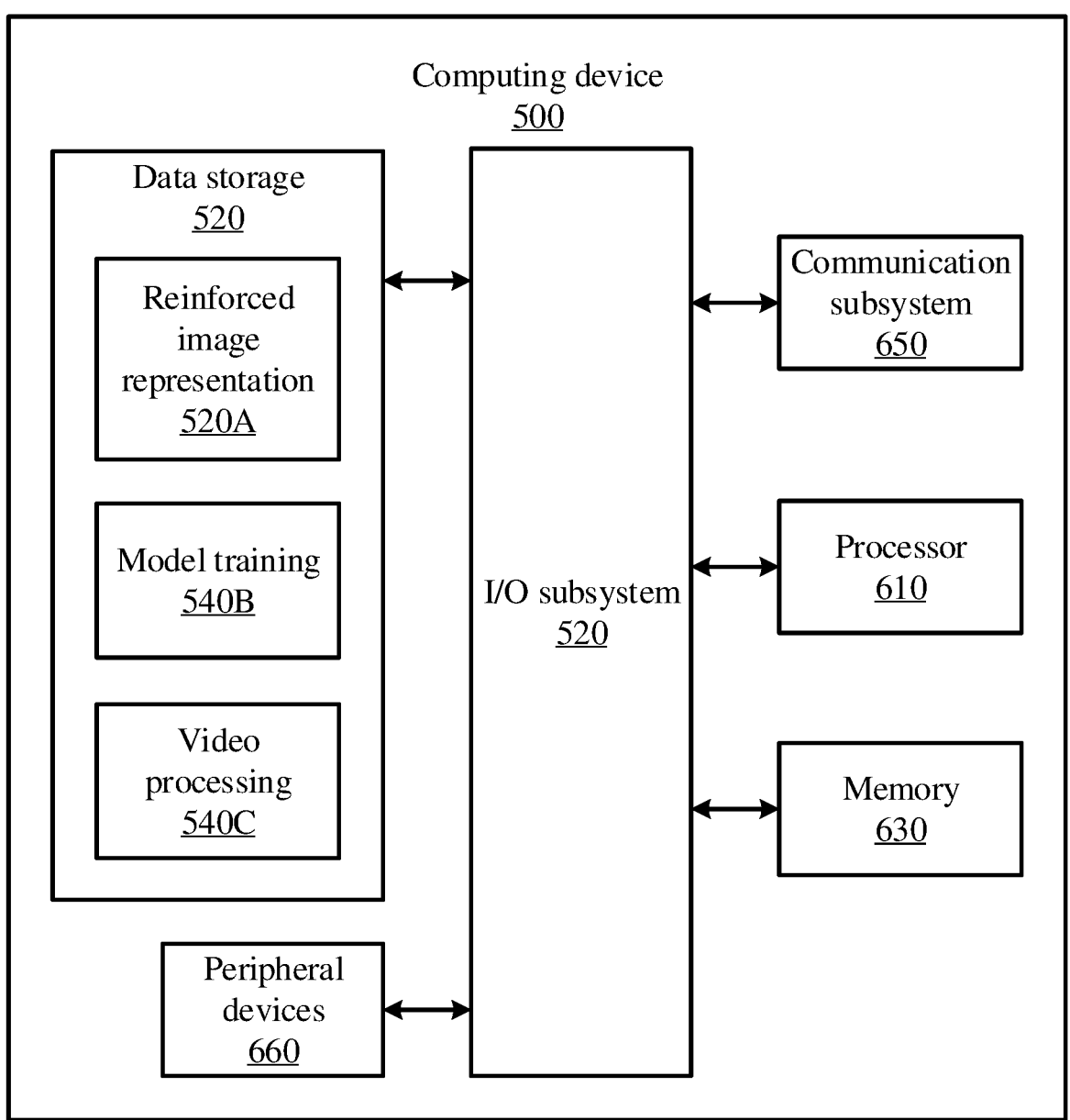
FIG. 5 is a block diagram of a computer system that performs video processing, in accordance with an embodiment of the present invention.

Referring now to FIG. 5, an exemplary computing device 500 is shown, in accordance with an embodiment of the present invention. The computing device 500 is configured to perform video processing.

The computing device 500 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 500 may be embodied as one or more compute sleds, memory sleds, or other racks, sleds, computing chassis, or other components of a physically disaggregated computing device.

As shown in FIG. 5, the computing device 500 illustratively includes the processor 510, an input/output subsystem 520, a memory 530, a data storage device 540, and a communication subsystem 550, and/or other components and devices commonly found in a server or similar computing device. The computing device 500 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 530, or portions thereof, may be incorporated in the processor 510 in some embodiments.

The processor 510 may be embodied as any type of processor capable of performing the functions described herein. The processor 510 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 530 may be embodied as any type of volatile or non-volatile memory or data storage capable of performing the functions described herein. In operation, the memory 530 may store various data and software used during operation of the computing device 500, such as operating systems, applications, programs, libraries, and drivers. The memory 530 is communicatively coupled to the processor 510 via the I/O subsystem 520, which may be embodied as circuitry and/or components to facilitate input/output operations with the processor 510, the memory 530, and other components of the computing device 500. For example, the I/O subsystem 520 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 520 may form a portion of a system-on-a-chip (SOC) and be incorporated, along with the processor 510, the memory 530, and other components of the computing device 500, on a single integrated circuit chip.

The data storage device 540 may be embodied as any type of device or devices configured for short-term or long-term storage of data such as, for example, memory devices and circuits, memory cards, hard disk drives, solid state drives, or other data storage devices. The data storage device 540 can store program code 540A for performing reinforced image representation learning, 540B for model training, and/or 540C for video processing. Any or all of these program code blocks may be included in a given computing system. The communication subsystem 550 of the computing device 500 may be embodied as any network interface controller or other communication circuit, device, or collection thereof, capable of enabling communications between the computing device 500 and other remote devices over a network. The communication subsystem 550 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 500 may also include one or more peripheral devices 560. The peripheral devices 560 may include any number of additional input/output devices, interface devices, and/or other peripheral devices. For example, in some embodiments, the peripheral devices 560 may include a display, touch screen, graphics circuitry, keyboard, mouse, speaker system, microphone, network interface, and/or other input/output devices, interface devices, and/or peripheral devices.

Of course, the computing device 500 may also include other elements (not shown), as readily contemplated by one of skill in the art, as well as omit certain elements. For example, various other sensors, input devices, and/or output devices can be included in computing device 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 500 are readily contemplated by one of ordinary skill in the art given the teachings of the present invention provided herein.

Figure 6:
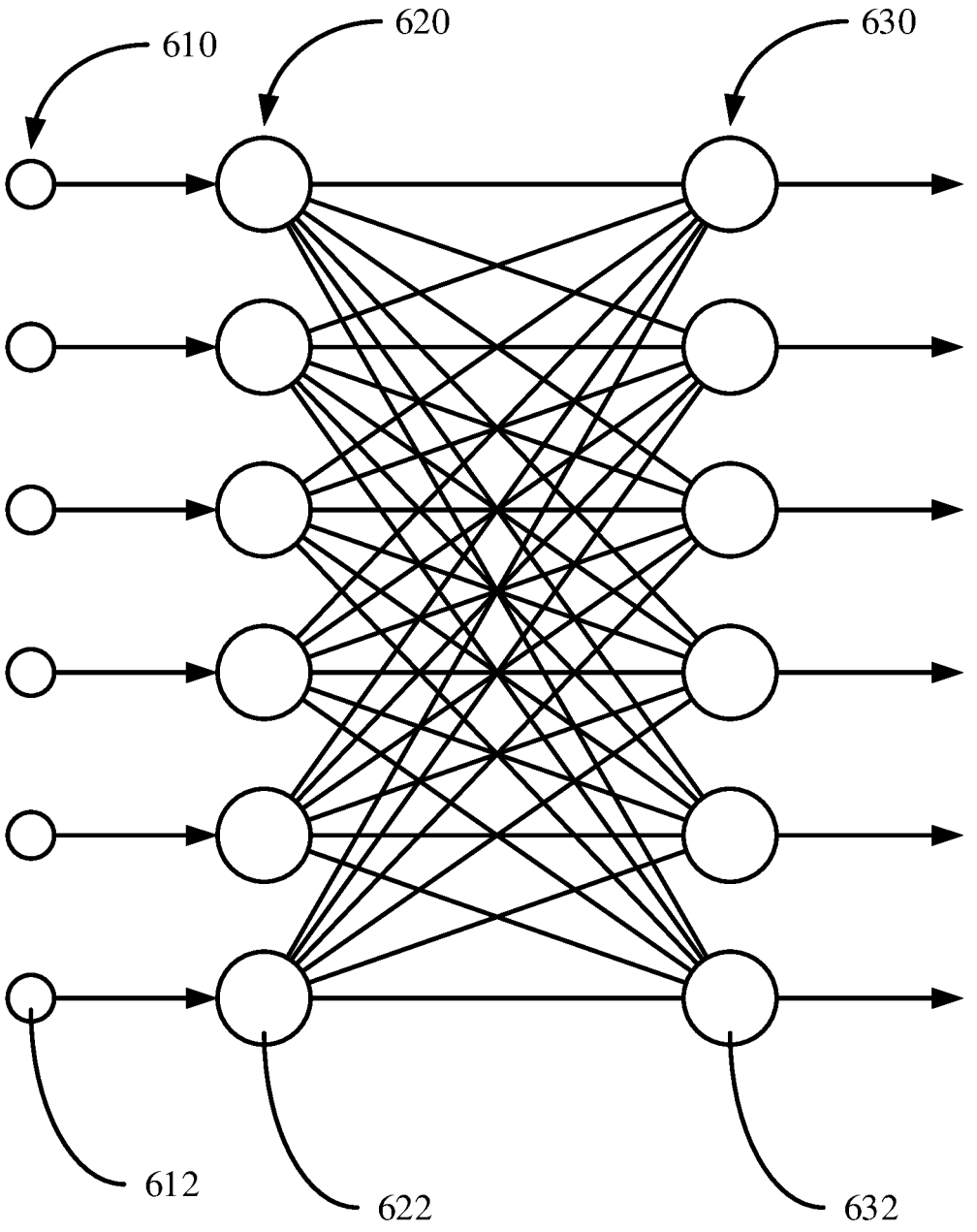
FIG. 6 is a diagram of a neural network architecture that can be used to implement part of a video processing model, in accordance with an embodiment of the present invention.
Figure 7:
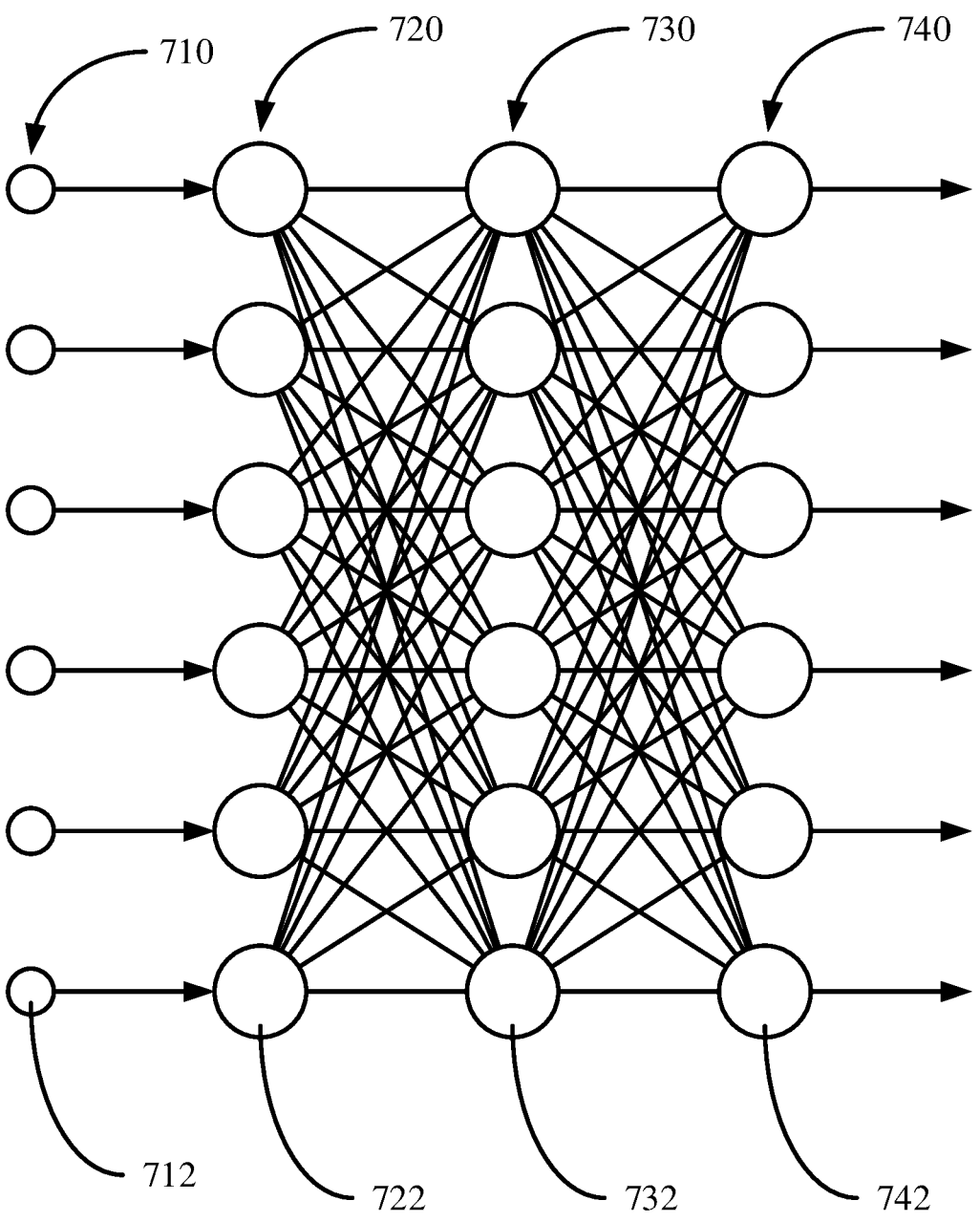
FIG. 7 is a diagram of a deep neural network architecture that can be used to implement part of a video processing model, in accordance with an embodiment of the present invention.

Referring now to FIGS. 6 and 7, exemplary neural network architectures are shown, which may be used to implement parts of the present models. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be outputted.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 620 of source nodes 622, and a single computation layer 630 having one or more computation nodes 632 that also act as output nodes, where there is a single computation node 632 for each possible category into which the input example could be classified. An input layer 620 can have a number of source nodes 622 equal to the number of data values 612 in the input data 610. The data values 612 in the input data 610 can be represented as a column vector. Each computation node 632 in the computation layer 630 generates a linear combination of weighted values from the input data 610 fed into input nodes 620, and applies a non-linear activation function that is differentiable to the sum. The exemplary simple neural network can perform classification on linearly separable examples (e.g., patterns).

A deep neural network, such as a multilayer perceptron, can have an input layer 620 of source nodes 622, one or more computation layer(s) 630 having one or more computation nodes 632, and an output layer 640, where there is a single output node 642 for each possible category into which the input example could be classified. An input layer 620 can have a number of source nodes 622 equal to the number of data values 612 in the input data 610. The computation nodes 632 in the computation layer(s) 630 can also be referred to as hidden layers, because they are between the source nodes 622 and output node(s) 642 and are not directly observed. Each node 632, 642 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the inputted data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 632 in the one or more computation (hidden) layer(s) 630 perform a nonlinear transformation on the input data 612 that generates a feature space. The classes or categories may be more easily separated in the feature space than in the original data space.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for video processing, comprising:
    enriching an input video feature from an input video frame set using a meta-action bank of a plurality of video sub-actions to generate enriched features, wherein enriching the video frame feature is performed as:

$$\tilde{f}_{*j}^{s/q} = (1 - \rho)f_{*j}^{s/q} + \rho \sum_{l=1}^{\kappa} \alpha_{jl} d_l^e$$

where p is a parameter balancing between accepting external knowledge with keeping original representations, a is a cosine similarity between the video frame feature $f_{*j}^{s/q}$, $d_l^e$ is a projection coefficient on a basis within the meta-action bank e, $\kappa$ is a number of bases in the meta-action bank, and s/q indicates that the term is treated the same for support frames s and query frames q;
    performing reinforced image representation using reinforcement learning to compare support image frames and query image frames and determine an importance of the input video frame;
    performing a classification on the input video frame based on the importance and the enriched features to generate a label; and
    performing an action responsive to the generated label.

2. The method of claim 1, wherein the reinforcement learning uses a policy based on a feature of the input video frame, an aggregated feature of remaining frames of the input video frame set, and a separate video.

3. The method of claim 2, wherein the aggregated feature is a weighted average of features of the remaining frames.

4. The method of claim 1, wherein the meta-action bank includes information for a plurality of different action categories to establish an action space.

5. The method of claim 1, wherein the label identifies an action within the input video frame set.

6. The method of claim 1, wherein performing the action includes an action selected from the group consisting of generating additional information relating to the label and performing a security action relating to the label.

7. A system for video processing, comprising:

a hardware processor; and a memory that stores a computer program which, when executed by the hardware processor, causes the hardware processor to:

enrich an input video feature from an input video frame set using a meta-action bank of a plurality of video sub-actions to generate enriched features, wherein enrichment of the video frame feature is performed as:

$$\tilde{f}_{*j}^{s/q} = (1-\rho)f_{*j}^{s/q} + \rho\sum_{l=1}^{K}\alpha_{jl}d_l^e$$

where p is a parameter balancing between accepting external knowledge with keeping original representations, a is a cosine similarity between the video frame feature $f_{*j}^{s/q}$, $d_l^e$ is a projection coefficient on a basis within the meta-action bank e, $\kappa$ is a number of bases in the meta-action bank, and s/q indicates that the term is treated the same for support frames s and query frames q;

perform reinforced image representation using reinforcement learning to compare support image frames and query image frames and determine an importance of the input video frame;

perform a classification on the input video frame based on the importance and the enriched features to generate a label; and perform an action responsive to the generated label.

8. The system of claim 7, wherein the reinforcement learning uses a policy based on a feature of the input video frame, an aggregated feature of remaining frames of the input video frame set, and a separate video.

9. The system of claim 8, wherein the aggregated feature is a weighted average of features of the remaining frames.

10. The system of claim 7, wherein the meta-action bank includes information for a plurality of different action categories to establish an action space.

11. The system of claim 7, wherein the label identifies an action within the input video frame set.

12. The system of claim 7, wherein the computer program further causes the hardware processor to perform the action as an action selected from the group consisting of generating additional information relating to the label and performing a security action relating to the label.

\* \* \* \* \*